March 3, 1970  J. BELART  3,498,423
ADJUSTING DEVICE FOR DISK BRAKE
Filed Jan. 25, 1968  2 Sheets-Sheet 1
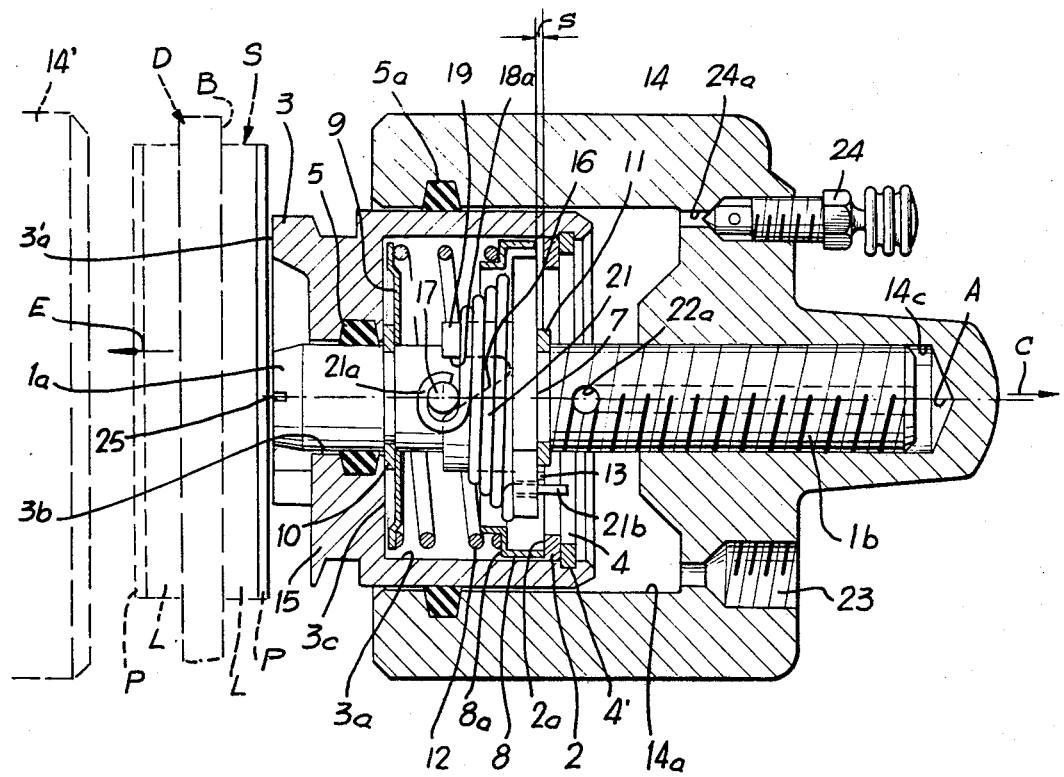
FIG.1
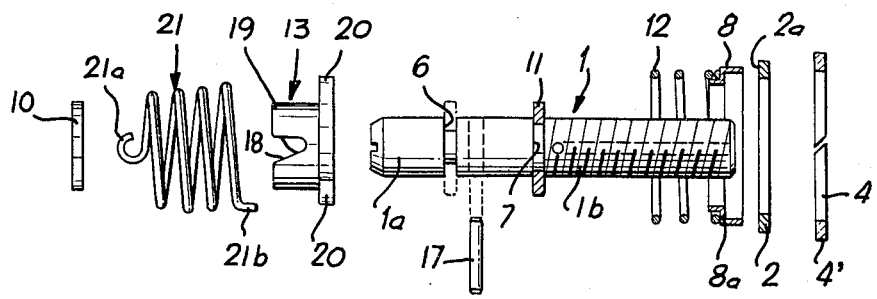
FIG.1-A
JUAN BELART
INVENTOR.
BY Karl F. Ross
Attorney March 3, 1970     J. BELART     3,498,423
ADJUSTING DEVICE FOR DISK BRAKE Filed Jan. 25, 1968     2 Sheets-Sheet 2

JUAN BELART
INVENTOR.

BY

Karl F. Ross
Attorney

United States Patent Office 3,498,423
Patented Mar. 3, 1970

3,498,423
ADJUSTING DEVICE FOR DISK BRAKE
Juan Belart, Walldorf, Hesse, Germany, assignor to Alfred Teves G.m.b.H., Frankfurt am Main, Germany, a corporation of Germany
Filed Jan. 25, 1968, Ser. No. 700,515
Claims priority, application Germany, Jan. 27, 1967, T 33,091
Int. Cl. F16d 65/38, 55/00
U.S. Cl. 188—196                    11 Claims

ABSTRACT OF THE DISCLOSURE

A wear-compensating disk brake in which the wheel-brake cylinder is hydraulically pressurizable to urge the piston and its brakeshoe against the disk and, at least in one yoke half of the brake housing, spring means applies a restoring force to the piston whose return stroke is limited by a stop ring on a bolt adjustably threaded axially into the bottom of the wheel-brake cylinder. The bolt carries a camming sleeve which is effective, during the forward stroke of the piston, to advance the threaded bolt and establish a new rest position for the piston when the stroke of the latter exceeds the desired brake play.

My present invention relates to hydraulic-vehicle brakes and, more particularly, to hydraulic-brake systems having piston-and-cylinder arrangements provided with a self-adjusting mechanism for resetting the rest position of the piston upon wear of the brake lining.

It has already been proposed to provide so-called "self-adjustment" mechanisms in vehicle brakes and the like whereby the piston member is automatically reset with respect to its rest position in order to re-establish a predetermined brake play upon wear of the brake lining. Such systems for the compensation of brake-lining wear may operate in various ways. In one case, each brake actuation resets the rest position of the brakeshoe (and the piston) by accommodating a restoring movement or stroke of the piston which is always a predetermined amount less than the original stroke. A follower is provided here to prevent complete return of the brakeshoe or piston. In another arrangement, the follower is advanced only when the brakeshoe is displaced beyond the predetermined amount corresponding to normal brake play. In the first of these systems, it has been found that difficulties are often encountered because of excessive adjustment of the rest position of the brakeshoe. In some cases, this rest position is advanced to the point that the brakeshoe frictionally engages the braking surface of the disk even when the brake is released. With the second system, it is difficult to maintain a constant brake play within relatively small tolerances.

It is, therefore, the principal object of the present invention to provide an improved automatically operable adjusting means of a compact construction and low cost which nevertheless allows effective and accurate repositioning of the rest position of a brakeshoe in dependence upon brake lining wear.

Another object of the present invention is to provide an improved disk-brake arrangement of the general characteristics described wherein overadjustment and underadjustment of the brake play is precluded.

Still another object of this invention is to provide a brake system of the general characteristics described which has effective-operating, inexpensive and simple adjusting means for automatically compensating the wear of a brake lining.

I have found that it is possible to overcome the disadvantages of earlier adjusting systems by applying, in an improved manner, principles originally set forth in my copending application Ser. No. 655,150 of July 21, 1967. In that application, I have described a disk-brake arrangement in which a hydraulic piston is axially shiftable in a cylinder to drive a proximal brakeshoe against a disk rotatable about an axis parallel to the axis of the cylinder. The self-adjusting means comprises a threaded spindle which is screwed into the cylinder wall remote from the brakeshoe and co-operates with an axially shiftable sleeve. The threaded spindle or bolt, which forms a stop for the piston, is provided with cam means constituted in part by a radial pin which is shiftable along an inclined camming surface of the sleeve which is axially shiftable with a lost motion determined by the pin and a stop ring carried by the bolt. A torsion spring is provided between the sleeve and the pin to continuously urge the camming surface against the latter, angular rotation of the sleeve during the forward piston stroke being limited by frictional means.

In accordance with the principles of the present invention, the rest position of the piston and, therefore, its limiting position upon the return stroke, is established by an abutment carried by the threaded spindle or bolt which passes coaxially through the wheel-brake cylinder and the piston and is screwed into the end wall at the close side of the cylinder. During the forward movement of the piston, the rotatable sleeve is advanced axially to cam the bolt and advance the rest position only upon displacement of the piston beyond the predetermined normal play thereof. This construction allows the piston to move within its normal play without any stepping of the adjusting means but, as soon as the normal play is exceeded, brings the camming arrangement into operation to advance the rest position of the piston. The system thus permits of continuous adjustment to greater or lesser degrees in dependence upon the wear of the brake lining which tends to increase the brake play.

As noted earlier, a preferred embodiment of the present invention provides that the threaded bolt has its screw-thread formed along the shank of the bolt remote from the brake disk and the piston while the balance of the bolt is unthreaded and passes axially through the piston. In this unthreaded portion, I provide a pair of axially spaced circumferential grooves within the piston, the groove proximal to the brakeshoe and disk receiving an abutment ring which, upon engagement with the inner surface of the end wall of the cup-shaped system, establishes the rest position of the latter. The other groove, remote from the brake disk, receives a stop ring which engages the camming sleeve to limit its displacement away from the disk.

The nonthreaded portion of the bolt, which is screwed axially into the housing in which the wheel-brake cylinder is formed, also carries within the hollow piston the camming means which is axially shiftable by the piston upon its displacement beyond the predetermined brake play to rotate the bolt or spindle and thereby advance the abutment formed by the ring locked in a groove of the bolt proximal to the brake disk. The piston is open axially away from the disk and is formed at the end of the piston chamber, with a wall through an opening of which the nonthreaded portion of the bolt extends axially. The abutment is thus formed by a ring engaging this wall adjacent the opening, the ring simultaneously forming a stop for a spring seat against which a helical-coil or leaf spring acts. The spring, which continuously urges the piston away from the disk in the restoring or return direction, must be overcome by the hydraulic pressure for brake operation. The other end of the spring acts via an annular seat or tongues formed directly on the spring against a friction ring which rests against the end of the piston distal from the disk. To this end, an inwardly open annular groove may be provided in the wall of the piston chamber to receive a split ring against which the friction ring is held via the restoring spring.

As described in my copending application Ser. No. 655,150, the camming means can be constituted by a camming body, e.g. a sleeve, which is axially and rotatably movable on the nonthreaded portion of the bolt and may rest against another stop ring anchored in a groove of the bolt spaced from the abutment thereof which defines the rest position of the piston. The sleeve is provided with a camming surface inclined to the axis of the bolt or a genetratrix of the sleeve by 20° to 45°, the camming surface co-operating with a transverse pin anchored to the bolt. The camming body is further provided with a plurality of angularly equispaced, radially extending arms which are engageable with the friction ring to limit rotation of the camming body with respect to the bolt. A torsion spring engages this pin and the body to restore the original positions of the camming surface and pin upon advance of the bolt to reset the rest position of the piston. Additionally, I have found it advantageous to anchor the bolt in a blind bore of the housing, an axially extending passage being formed in the threaded portion of the bolt and communicating with the cylinder to prevent buildup of the pressure in this bore when the bolt is threaded into the latter.

The above and other objects, features and advantages of the present invention will become more readily apparent from the following description, reference being made to the accompanying drawing in which:

FIG. 1 is an axial cross-sectional view through a wheel-brake cylinder of a disk-brake system in accordance with the present invention, other portions of the brake being shown in dot-dash lines;

FIG. 1A is an exploded view of the adjusting mechanism;

Figure 2:
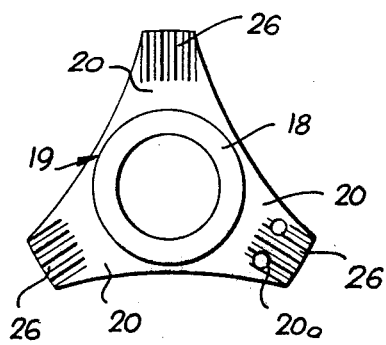
FIG. 2 is an elevational view of the camming body of this system.

In FIGS. 1 and 2, I show a disk-brake assembly in which the brake disk is represented at D and the housing comprises a pair of yoke halves 14 and 14'. The automatic adjusting system for the right-hand yoke half 14 only is described here. The system comprises a cylinder 14a formed in the yoke half 14 and centered upon an axis A perpendicular to the braking face B of the disk D against which a brakeshoe S can be urged by a piston 3. The brakeshoe S comprises a metallic backing plate P and a brake lining L of conventional construction. It will be apparent that any of the common type of brakeshoe and housing structure may be employed here (see the copending application mentioned earlier). One of the yoke halves 14, 14' is supported on a flange of the axle housing of the wheel while the disk D is connected with the tire-carrying wheel disk of the corresponding vehicle wheel.

Piston 3 is of the cup-shaped hollow type with its interior chamber 3a open rearwardly, i.e. to the right, into the cylinder 14a of yoke half 14. An inlet port 23 serves to connect the cylinder 14a with the corresponding chamber of a hydraulic-brake master cylinder whose piston is shiftable directly or indirectly by the brake pedal of the vehicle. The master cylinder may be of the type described in Principles of Automotive Vehicles, U.S. Government Printing Office, Washington, D.C., 1956, pp. 437 ff. At the upper side of the cylinder 14a, I provide a passage 24a in which a bleeding or venting valve 24 of conventional construction is mounted.

The piston 3, constructed as a stepped piston, has a force face 3'a which is partly cut away to provide a contact zone against the backing plate P of the brakeshoe S which is eccentric from the centrum of the disk-engaging surface of the brake lining L. It will be understood that the piston arrangement and automatic adjusting means of cylinder 14' are identical to that described in connection with the yoke half 14 when the brake housing is of the fixed-yoke type. When, however, the housing forms a "floating yoke" or a swingable member adapted to transmit reaction force to a remote brakeshoe or the disk is axially shiftable, only one adjusting arrangement need be used.

The piston 3 is formed with an axially extending bore 3b through which the end 1a of an adjusting bolt 1, proximal to the disk D, extends; a slot 25 is formed in the end 1a of this bolt to allow a tool (e.g. a screwdriver) to be inserted for setting the dexter to which the threaded portion 1b of the bolt 1 is screwed into a threaded bore 14c in the far wall of cylinder 14a. Beyond the threaded end 1b of the bolt 1 and between this threaded end and the head 1a, I provide a pair of circumferential grooves 6 and 7 which are axially spaced apart and respectively receive the split abutment rings 10 and 11. The disk-side ring 10 engages the inner surface 3c of a wall 15 forming the end of chamber 3a. As will be apparent hereinafter, the ring 10 forms a stop for the piston 3 in its return movement (arrow C) away from the disk D.

The stop ring 11 remote from the disk D forms an abutment limiting the axial movement of a sleeve 19 which, at its end turned away from the disk D, is formed with three angularly equispaced arms 20 extending radially toward the vertices of an equilateral triangle. These arms are mounted on the sleeve 19 which is also formed along its end turned toward the disk D, with a camming recess 18 having axially extending edge 18a and an inclined edge 16 or camming surface co-operating with a radial pin 17 mounted in the bolt 1. The pin 17 serves as an anchor for one end 21a of a spiral torque spring 21 as the other end is anchored in an opening 20a of one of the arms 20 as shown at 21b. The spring 21 applies an angular moment between the sleeve 19 and the bolt 1 which constantly urges the inclined camming surface 16, including an angle of 20° to 45° with a generatrix of the sleeve, against the pin 17.

The ring 10 is engaged, along its surface remote from the disk D, by a plate 9 forming a seat for a restoring spring 12 of the helical compression type. At its opposite axial end, the spring 12 rests against a seat 8a formed on an abutment ring 8 of cylindrical configuration. The cylindrical ring 8, in turn, rests against a stop ring 2 held by spring ring 4 which is seated in an inwardly open circumferential groove 4'.

The coil spring 12 thus urges the piston 3 continually in the direction of arrow C, rearwardly and away from the disk D. Only when the force of spring 12 is overcome by the hydraulic pressure in cylinder 14a can the piston 3 be shifted to the left (arrow E) to apply the brakeshoe S to the disk D. The wall 15 engages the ring 10 in the extreme right-hand position of the piston 3 under the action of spring 12, thereby setting the rest position of the system.

The camming means of the present invention forms a lost-motion friction clutch as has been described in my aforementioned copending application. Thus, the sleeve 19 and the arms 20 together form a follower which is generally designated at 13 and is best shown in FIG. 1A. The radial arms 20 are frictionally engageable with the inner surface 2a of the ring 2 with which they form a friction clutch. The lost motion of the follower 13 is established by the pin 17 and the surface 2a of ring 2. The bolt 1 is normally screwed into the bore 14c of the yoke half 14 just to the point that, with the brake hydraulically deactivated, the follower 13 rests against the ring 11 and a play s is established between the arms 20 and the clutch surface 2a, the play s being equal to the desired brake play.

During normal hydraulic operation, assuming no wear of the lining L of brakeshoe S, hydraulic fluid is supplied under pressure at port 23 from the master cylinder. The piston 3 is urged to the left (arrow E) to bring the brakeshoe S into engagement with the disk D. Since there has been no wear of the lining, the clutch surface 2a of ring 2 just contacts the arms 20. Arms 20 may, as seen in FIG. 2, be formed with radially extending incisions, corrugations or ribs which engage complementarily surfaced ring 2 to increase the force retarding relative rotation of the follower 13 and the ring. Upon hydraulic deactivation of the brake, the pressure in chamber 14a is reduced and the spring 12 displaces the piston 3 in the direction of arrow C until surface 3c of wall 15 is stopped by ring 10. In the event of wear of the lining L of the brakeshoe S, the stroke of piston 3 will exceed the brake play s previously established. When this occurs, surface 2a of ring 2 is gripped by the tongues formed by the outer ends of arms 20 to prevent rotation of follower 13. The follower 13, however, is shifted axially in the direction of arrow E so that surface 16 cammingly engages the pin 17 and rotates the threaded bolt 1 to advance the ring 10 in the direction of arrow E. Thus the rest position of the piston 3 is advanced by an amount equal to the wear of the brake lining.

An important aspect of the device described is that the friction between the arms 20 and ring 2 is sufficient that the follower 13, during its axial movement, is not rotated until the threaded bolt 1 has been advanced to bring the ring 10 of this bolt to a new rest position. Now upon release of hydraulic pressure, spring 12 drives the piston 3 in the direction of arrow C and the torsion spring 21 rotates the follower 13, as the pin 17 remains stationary, to reset the relative position of the camming surface as illustrated in FIG. 1. The adjustment operation remains constant through the entire wear of the brake lining. A seal 5 is provided along the bore 3b to prevent leakage of hydraulic fluid past the head 1a of the bolt while a further seal 5a is formed in the wall of cylinder 14a for engagement with the piston 3. An axially extending bore 22 is provided in the threaded portion 1b of the bolt and opens radially at 22a into chamber 14a to relieve any hydraulic pressure built up in the bore 14c as the threaded bolt 1 is screwed into the latter.

Figure 3:
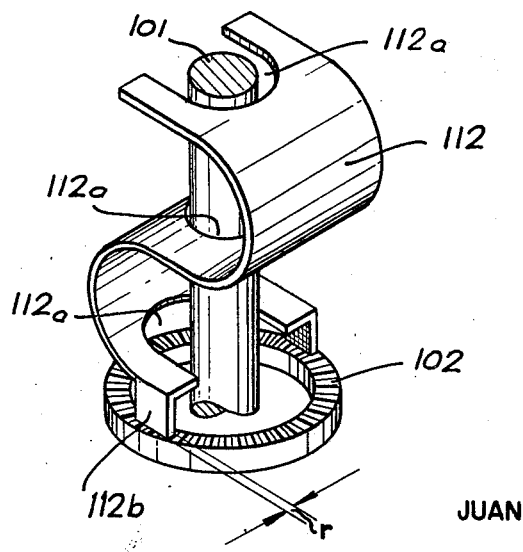
FIG. 3 is a perspective view of a restoring spring assembly adapted to replace the coil spring shown in FIGS. 1 and 1A.

In FIG. 3, I show a variation of the present invention wherein the return spring 112 is an S-shaped leaf spring 112 formed with throughgoing openings 112a to accommodate the bolt 101 at its end close to the friction ring 102, the spring 112 being formed with tongues 112b which bypass the follower 13 (FIG. 1A) which has not been illustrated in FIG. 3. The tongues 112b require only a limited radial dimension (r) and are analogous in function to the member 8 previously described. Note also that the ring 102 engageable between arms 20 of the follower 13 is toothed to increase the frictional contacts between the arms 20 of this clutch ring. An advantage of the S-shaped leaf spring illustrated here is that no torque arises during compression as is the case with a coil spring as illustrated in the embodiment of FIGS. 1, 1A and 2.

I claim:
1. In a brake system having at least one brakeshoe shiftable toward a braking face, a hydraulic cylinder, a piston axially shiftable in said cylinder and operable to shift said brakeshoe, the improvement which comprises spring means urging said piston in a direction away from said face for imparting restoring movement to said piston upon relief of hydraulic pressure in said cylinder, a bolt mounted in said cylinder and forming an abutment for said piston engageable therewith to establish a rest position therefor in the direction in which said piston is urged by said spring means, and self-adjusting means in said cylinder for advancing said abutment in step with the wear of said lining upon hydraulic displacement of said piston away from said abutment by an extent in excess of a predetermined piston stroke, said brake system including a housing forming said cylinder, said bolt being threaded into said housing and having an unthreaded portion extending axially into said piston, said piston being generally cupshaped opening away from said face and being formed with an opening slidably receiving said bolt, said unthreaded portion of said bolt being formed with a circumferential groove relatively proximal to said braking face, said abutment being constituted by a ring received in said groove and engageable with a wall of said piston adjoining said opening.

2. The improvement defined in claim 1 wherein said spring means includes a spring extending along said bolt and seated at one axial end against said ring and at its other axial ring against said piston.

3. The improvement defined in claim 2 wherein said ring is a leaf spring of undulating configuration formed with openings through which said bolt extends.

4. The improvement defined in claim 2 wherein said spring is a coil spring coaxially surrounding said bolt.

5. The improvement defined in claim 2 wherein said piston is formed remote from said wall with a friction ring, said other end of said spring bearing against said friction ring.

6. The improvement defined in claim 5 wherein said self-adjusting means includes camming means between said bolt and said friction ring for rotating said bolt relatively to said housing upon relative axial displacement of said bolt and said piston.

7. The improvement defined in claim 6 wherein said camming means includes a transverse pin anchored to said bolt along said unthreaded portion thereof, a camming body rotatably mounted upon said nonthreaded portion of said bolt for axial and rotary movement thereon, said body having a camming surface inclined to the axis of said bolt and engageable with said pin for rotating said bolt relatively to said body and said housing upon relative axial displacement of said body and said pin, restoring means interconnecting said body and said bolt for angularly displacing said body to return said pin and said body to an original relatively angular position upon hydraulic depressurization of said cylinder, said body having means engageable with said ring upon hydraulic displacement of said piston to limit rotation of said body and effect camming rotation of said bolt to advance said abutment upon wear of said lining.

8. The improvement defined in claim 7 wherein said means frictionally engageable with said ring is formed as a plurality of angularly spaced arms extending from said body, said restoring means including a torsion spring interconnecting said body and said pin.

9. The improvement defined in claim 5 wherein said bolt has an end extending through said piston and formed with means engageable by a tool to adjust the degree to which said bolt is threaded into said housing.

10. The improvement defined in claim 5 wherein said friction ring and said body are formed with interengaging teeth.

11. The improvement defined in claim 5 wherein said camming surface is inclined at 20° to 40° to the axis of said bolt.

References Cited

UNITED STATES PATENTS 3,344,891   10/1967   Thirion _____ 188—73

DUANE A. REGER, Primary Examiner

U.S. Cl. X.R.

188—73